United States Patent [19]
Morra

[11] Patent Number: 4,856,098
[45] Date of Patent: Aug. 8, 1989

[54] INDUCTANCE SENSOR AND CIRCUIT ARRANGEMENT FOR THE DETECTION OF VEHICLE ATTITUDE

[75] Inventor: Luigi Morra, Asti, Italy
[73] Assignee: Industrie Riunite SPA, Turin, Italy
[21] Appl. No.: 144,220
[22] Filed: Jan. 15, 1988
[30] Foreign Application Priority Data
 Jan. 16, 1987 [IT] Italy .............................. 20524/87[U]
[51] Int. Cl.$^4$ .................. G01B 7/14; G08C 19/06
[52] U.S. Cl. .................................. 324/207; 324/236; 340/870.31
[58] Field of Search ........ 324/207, 208, 234, 236–238; 336/45; 331/65; 340/870.31, 870.32, 870.35, 870.36; 280/6, 6 H, 6.1, DIG. 1, 707; 318/653

[56] References Cited
U.S. PATENT DOCUMENTS

| | | | |
|---|---|---|---|
| 3,022,451 | 2/1962 | Chapman et al. | 324/237 X |
| 3,255,405 | 6/1966 | French | 324/234 |
| 3,737,764 | 6/1973 | Dufayet | 324/237 |
| 3,891,918 | 6/1975 | Ellis | 324/208 |
| 4,103,233 | 7/1978 | Timmermans et al. | 340/870.31 |
| 4,350,954 | 9/1982 | Seilly | 324/208 |
| 4,629,983 | 12/1986 | Boomgaard et al. | 324/208 |

FOREIGN PATENT DOCUMENTS 1006543 10/1965 United Kingdom ................ 324/236

Primary Examiner—Gerard R. Strecker
Attorney, Agent, or Firm—Robert P. Seitter

[57] ABSTRACT

A circuit for the detection of vehicle attitude, comprising a signal sensor, which is arranged inside the cylinder of a shock absorber and coaxial with the piston thereof. The sensor cooperates with a processor for receiving and processing the sensor signals. The sensor includes a first coil electrically connected to a second coil. The free ends of the coils are electrically connected to capacitive circuit means so as to form a variable-frequency resonant circuit fed by an AC power supply through suitable terminals. The circuit is connected to the inputs of parallel processors which convert the frequencies of the variable signal controlled by the sensor and of the fixed signal provided by the power supply to variable-voltage signals, respectively. Both converted signals are applied to a comparator circuit at the output terminals of which any voltage change is measured so as to detect any relative position change of the piston with respect to the cylinder.

3 Claims, 2 Drawing Sheets

INDUCTANCE SENSOR AND CIRCUIT ARRANGEMENT FOR THE DETECTION OF VEHICLE ATTITUDE

BACKGROUND OF THE INVENTION

The present invention relates to adjusting and controlling electronic equipment for automotive vehicles and, more particularly, to a circuit device for the detection of vehicle attitude. The device comprises a signal sensor including a first and a second coil enclosed inside of the vehicle shock absorber and fixed on its working cylinders so as to be coaxial with its piston. The coils cooperate with means for the processing of the signal detected by the sensor.

In the automotive field different detection systems are employed in order to determine the height above ground level of a vehicle. The sensors of these detection systems are usually placed between the vehicle body and the vehicle wheels, or it is pre-assembled in the shock absorber so as to avoid, through this integrated construction, problems of mounting the connections and the final assembly. The sensor employed can be of any known type, but the utilization of electrical winding, such as coils, fixed on the inner cylinder of the shock absorber, is more frequently adopted. These coils follow the change of the piston position inside the shock absorber. By using the described coils with a detector which is based on the inductance variation principle, it is possible to measure the change of the electrical quantities involved in the operation and therefore the relative positions of the piston and cylinder of the shock absorber. However, the measurement carried out by this detector requires subsequent thermal compensations, due to temperature variations during operation. Furthermore, overall dimension problems in housing the coils and the detection system has been encountered.

SUMMARY OF THE INVENTION

The object of this invention is to eliminate the above mentioned disadvantages, with regard to the measurement devices presently used, by providing a circuit device for the detection of the vehicle attitude, which is able to use the induction detector with coils, and which has a lower error index of the relative measurement, that is, a lower error with respect to the correspondence between the measured voltage and the relative position of the piston with respect to the shock absorber.

These and other objects are achieved according to the present invention by a circuit device for the detection of vehicle attitude, comprising a signal sensor which is arranged inside the cylinder of a shock absorber coaxial with the piston thereof. The sensor cooperates with means for processing the sensor signals. The sensor includes a first coil electrically connected to a second coil and the free ends of which are electrically connected to capacitive circuit means so as to form a resonsant circuit fed by an AC power supply through suitable terminals. The resonant circuit is connected to the processing means which, in turn, consist of a circuit for frequency-to-voltage conversion of the variable signal generated by the sensor and of the fixed signal provided by the power supply. Both signals are applied to a comparator circuit at the output terminals of which any voltage change is measured so as to detect any relative position change of the piston with respect to the cylinder.

BRIEF DESCRIPTION OF THE DRAWINGS

Further characteristics and advantages of the present invention can be more clearly gathered from the following detailed description of a preferred embodiment of a circuit device for the detection of vehicle attitude with reference to the accompanying drawings in which.

DETAILED DESCRIPTION OF A PREFERRED EMBODIMENT

Figure 1:
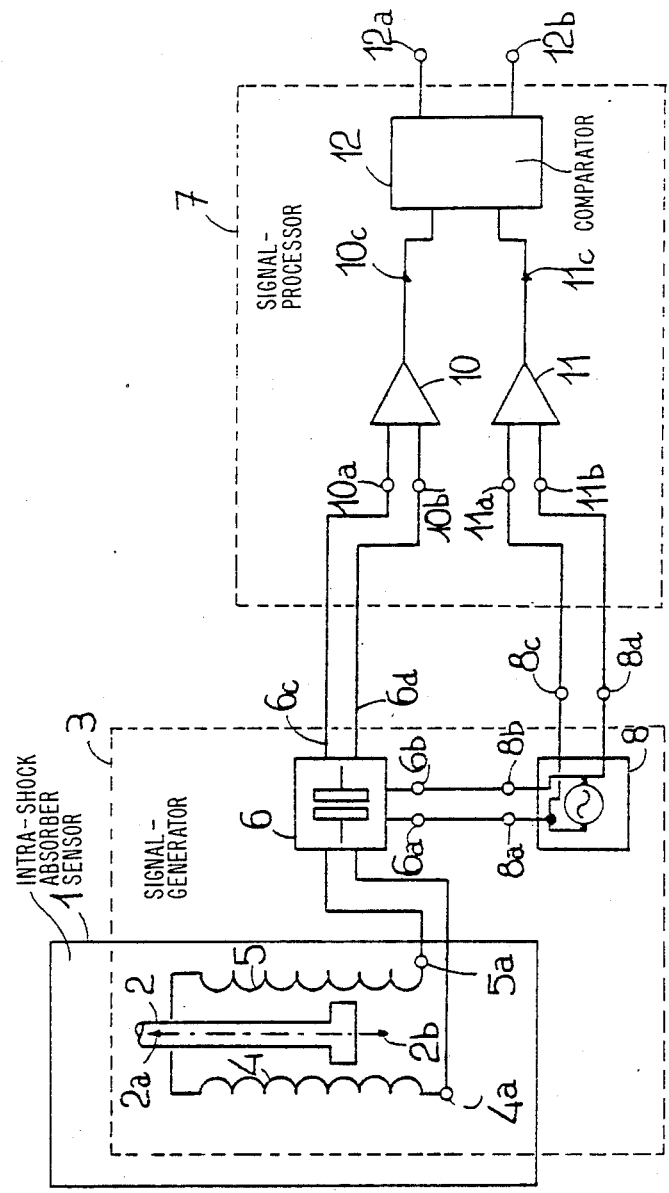
FIG. 1 is a general block diagram of the device according to the present invention.

With reference to FIG. 1, numeral 1 generally refers to the sensor components of the invention which are housed within the shock absorber cylinder. Shock absorber piston 2 reciprocates in the directions 2a and 2b. Around piston 2 and coaxial therewith are first and second inductance coils 4 and 5, electrically connected at one end so as to be in series.

Reference numeral 3 refers to a signal-generation portion of the inventive embodiment, which is enclosed by a dashed line. Enclosed by a second broken line is a signal-processing portion of the invention, generally indicated by reference numeral 7.

As shown in the drawing, the free ends 4a and 5a of the series-connected coils 4 and 5 are electrically connected to capacitive circuit means 6 into which are fed an alternating current from power supply 8. Capacitive circuit means 6 are so configured that the output therefrom, as measured at output terminals 6c and 6d, is a resonant signal the frequency of which depends on the inductance of coils 4 and 5. Output terminals 6c and 6d are connected to a first frequency-to-voltage converter 10 by way of respective input terminals 10a and 10b.

The power supply 8 is also connected to a second frequency-to-voltage converter 11 by means of the respective input terminals 11a and 11b.

The respective voltage signals 10c and 11c are provided at the output of converters 10 and 11, respectively, and are applied to the comparator 12 in order to output the final value of the detected signal to terminals 12a and 12b. The processing means 7 are physically separated from the signal-generation means 3, but they are electrically connected thereto.

Figure 2:
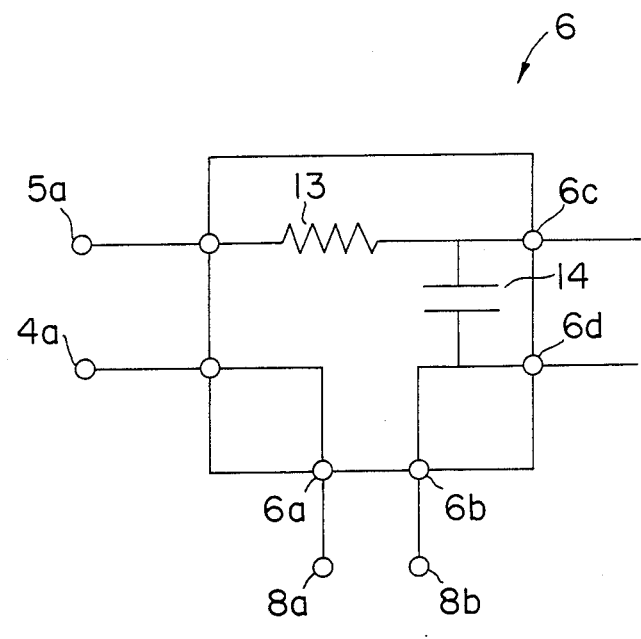
FIG. 2 is a circuit diagram of a capacitive circuit means of the preferred embodiment.

FIG. 2 of the drawings illustrates the specifics of the capacitive circuit means 6. In conjunction with the inductance coils 4 and 5, the circuit means provides a variable-frequency output signal at leads 6c and 6d in response to movement of the shock absorber piston 2. Input terminal 6b and output terminal 6d are directly connected, as are input terminal 6a and terminal 4a. Between terminals 4a and output terminal 6c are arranged the coils 4 and 5 and a resistive element 13, connected in series. A capacitive element 14 is placed across the output leads 6c and 6d.

The operation of the device according to the present invention is described as follows:

When the flux produced inside the coils 4 and 5 intercepts the piston 2 of the shock absorber, a variation of the inductance of the coils proportional to the relative position change of the piston 2 is obtained. Owing to this, the resonant circuit changes its own resonant frequency and therefore it is possible to derive via processing means 7 the displacement of the piston 2 occasioning the changes of resonant circuit characteristics. The new value of the resonant frequency is brought first into converter 10 while the reference signal of power supply 8 is brought into converter 11, and then both signals are converted to produce frequency signals 10c and 11c. Such signals are compared in a comparator 12 so as to evaluate even minor changes and hence to estimate, correspondingly, the position displacement of the piston 2 inside the shock absorber.

The foregoing evaluation is made by comparing the detected signal with the reference signal of the power supply 8. A voltage change is produced at the output of the comparator 12 which is proportional to the frequency change in the resonant circuit which is attributable to the inductance variation. Therefore, a definitive signal will reach the output stage of the processing means 7, which signal is temperature-compensated for safety reasons and which in any case represents a true correspondence between its value and the relative position of the piston inside the shock absorber.

It will be appreciated by those skilled in the art that by coupling the processing means 7 to the sensor group 3 and employing the inductance variation principle, a more reliable detection measurement is obtained, because there is realized a more rigid correspondence between parametric changes of the circuit described and those of the position of the piston 2 inside the shock absorber 3. In addition, particular mechanical calibrations are not required. It will also be appreciated that several structural and parametrical modifications and variations can be made to the device of the present invention, all falling within the scope of the appended claims.

What is claimed is:

1. A circuit for the detection of vehicle attitude, comprising a signal generating means including a signal sensor inside the cylinder of a shock absorber which is coaxial with the piston thereof, said sensor including a first inductance coil electrically connected at one end thereof to one end of a second inductance coil, said generating means further including capacitive circuit means and an AC power supply electrically connected to said capacitive circuit means and having the free ends of said coils electrically connected to said capacitive circuit means so as to form a resonant circuit fed by said power supply and producing a variable frequency output signal, said circuit further comprising a signal processing means cooperating with said generating means, said variable frequency output signal of said resonant circuit being electrically coupled to a first input of said processing means, said AC power supply producing a fixed frequency output signal and being electrically connected to a second input of said processing means, said processing means comprising a circuit for frequency-to-voltage conversion of the variable frequency output signal produced by the generating means and of the fixed frequency signal provided by the power supply, respectively, said variable and fixed signals being applied after said conversion to a comparator circuit at the output terminals of which a voltage change corresponds to a relative position change of said piston with respect to said cylinder.

2. The circuit for the detection of vehicle attitude as claimed in claim 1, wherein said AC power supply is applied to both said resonant circuit and said processing means.

3. The circuit for the detection of vehicle attitude as claimed in claim 1, wherein said processing means include first and second frequency-to-voltage converters respectively coupled to receive said variable and fixed output signals, each frequency-to-voltage converter having an output coupled to a respective input of said comparator circuit.

* * * * *